(12) United States Patent
Hinton et al.

(10) Patent No.: US 11,893,542 B2
(45) Date of Patent: *Feb. 6, 2024

(54) GENERATING SKILL DATA THROUGH MACHINE LEARNING

(71) Applicant: SkyHive Technologies Holdings Inc., Palo Alto, CA (US)

(72) Inventors: Sean Hinton, Vancouver (CA); Mohan Reddy, Fremont, CA (US); Sergey Bukharov, Vancouver (CA); Yuri Yerastov, San Mateo, CA (US)

(73) Assignee: SkyHive Technologies Holdings Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,988

(22) Filed: Oct. 23, 2021

(65) Prior Publication Data
US 2022/0343284 A1  Oct. 27, 2022

Related U.S. Application Data

(63) Continuation of application No. 17/241,069, filed on Apr. 27, 2021, now Pat. No. 11,164,153.

(51) Int. Cl.
*G06F 16/2457*   (2019.01)
*G06F 40/211*    (2020.01)
(Continued)

(52) U.S. Cl.
CPC ... *G06Q 10/1053* (2013.01); *G06F 16/24578* (2019.01); *G06F 40/211* (2020.01);
(Continued)

(58) Field of Classification Search
CPC ....... G06F 40/279; G06F 40/211; G06F 40/30
See application file for complete search history.

(56) References Cited

U.S. PATENT DOCUMENTS 10,460,028 B1 * 10/2019 Flann ..................... G06F 40/211
10,699,227 B2 *  6/2020 Johnston .......... G06Q 10/06313
(Continued)

OTHER PUBLICATIONS

Singh, Taranjeet, "Natural Language Processing With spaCy in Python", 2021 Real Python, 21pgs.
(Continued)

*Primary Examiner* — Kevin Ky
(74) *Attorney, Agent, or Firm* — Duane Morris LLP

(57) ABSTRACT

A data management server computer ("server") and related methods are disclosed to enhance electronic documents or search processes related to skill data, including skill names, using machine learning techniques. The server is programmed to organize skill names from a dictionary into a knowledge graph. The knowledge graph includes nodes that represent the skill names and words of the skill names and edges that represent syntactic or semantic relationships. The server is programmed to respond to skill-related requests using the knowledge graph and track access patterns of the knowledge graph in responding to the requests. The replies to the request can be generated based on the structure or access patterns of the knowledge graph and used as search results or skill-related data, such as resumes or job descriptions.

20 Claims, 9 Drawing Sheets

(51) Int. Cl.
*G06F 40/30* (2020.01)
*G06F 40/279* (2020.01)
*G06Q 10/1053* (2023.01)
*G06N 3/04* (2023.01)
*G06Q 30/018* (2023.01)
*G06Q 10/0639* (2023.01)

(52) U.S. Cl.
CPC ............ *G06F 40/279* (2020.01); *G06F 40/30* (2020.01); *G06N 3/04* (2013.01); *G06Q 10/06398* (2013.01); *G06Q 30/018* (2013.01)

(56) References Cited

U.S. PATENT DOCUMENTS

| | | | |
|---|---|---|---|
| 11,030,404 B1 | 6/2021 | Garg et al. | |
| 11,164,153 B1* | 11/2021 | Hinton | G06N 3/04 |
| 2006/0229899 A1 | 10/2006 | Hyder et al. | |
| 2007/0174270 A1* | 7/2007 | Goodwin | G06F 16/35 |
| | | | 707/999.005 |
| 2009/0012842 A1* | 1/2009 | Srinivasan | G06F 16/3344 |
| | | | 707/999.005 |
| 2012/0197631 A1* | 8/2012 | Ramani | G06F 40/30 |
| | | | 704/9 |
| 2014/0040275 A1* | 2/2014 | Dang | G06F 16/2228 |
| | | | 707/741 |
| 2015/0066477 A1* | 3/2015 | Hu | G06F 40/211 |
| | | | 704/9 |
| 2015/0310392 A1 | 10/2015 | Wu et al. | |
| 2016/0085853 A1* | 3/2016 | Zelevinsky | G06F 16/338 |
| | | | 707/765 |
| 2016/0125361 A1 | 5/2016 | Vivas et al. | |
| 2016/0163311 A1* | 6/2016 | Crook | G10L 15/183 |
| | | | 704/275 |
| 2016/0292149 A1* | 10/2016 | Mote | G06F 40/30 |
| 2017/0140043 A1* | 5/2017 | Apte | G06Q 10/0639 |
| 2017/0286835 A1* | 10/2017 | Ho | G06F 40/247 |
| 2017/0357625 A1* | 12/2017 | Carpenter | G06F 40/289 |
| 2018/0075070 A1* | 3/2018 | Chandrasekaran | G06F 16/367 |
| 2018/0181915 A1 | 6/2018 | Chen et al. | |
| 2018/0260474 A1* | 9/2018 | Surdeanu | G06F 40/211 |
| 2018/0357608 A1 | 12/2018 | Agrawal et al. | |
| 2019/0057310 A1* | 2/2019 | Olmstead | G06F 40/30 |
| 2019/0114593 A1 | 4/2019 | Champaneria | |
| 2020/0175109 A1 | 6/2020 | Gee et al. | |
| 2020/0193206 A1* | 6/2020 | Turkelson | G06F 18/214 |
| 2020/0250453 A1* | 8/2020 | Gupta | G06F 3/0482 |
| 2020/0320483 A1 | 10/2020 | Bayireddi et al. | |
| 2020/0380407 A1 | 12/2020 | Jiang et al. | |
| 2021/0004589 A1* | 1/2021 | Turkelson | G06V 10/82 |
| 2021/0150484 A1 | 5/2021 | Mayerle et al. | |
| 2021/0248324 A1 | 8/2021 | Choudhary | |
| 2022/0343284 A1* | 10/2022 | Hinton | G06N 3/04 |

OTHER PUBLICATIONS

Rossiello, G., et al., "Centroid-based Text Summarization through Compositionality of Word Embeddings", Proceedings of the MultiLing 2017 workshop on Summrztn & SEAST&G, pp. 12-21, Apr. 3, 2017, 10pgs.

Paass, Gerhard, et al., "Machine Learning for Document Structure Recognition", Studies in Comput. Intell. publ. Jan. 2011, Jun. 22, 2009, 22pgs.

BinMakhashen, Galal. M., et al., "Document Layout Analysis: A Comprehensive Survey", ACM Comp. surveys, vol. 52, No. 6, Oct. 2019, 36pgs.

"Linguistic Features", spaCy Usage Documentation printed Mar. 15, 2021, https://spacy.io/usage/linguistic-features/, 37pgs.

Yerastov, U.S. Appl. No. 17/364,699, filed Jun. 30, 2021, Non-Final Rejection, dated Oct. 13, 2021.

Hinton, U.S. Appl. No. 17/241,069, filed Apr. 27, 2021, Notice of Allowance, dated Jul. 21, 2021.

Hinton, U.S. Appl. No. 17/241,069, filed Apr. 27, 2021, Notice of Allowance and Fees Due, dated Sep. 20, 2021.

Yerastov, U.S. Appl. No. 17/364,699, filed Jun. 30, 2021, Notice of Allowance and Fees Due, dated Feb. 18, 2022.

* cited by examiner

GENERATING SKILL DATA THROUGH MACHINE LEARNING

BENEFIT CLAIM

This application claims the benefit under 35 U.S.C. § 120 as a Continuation of application Ser. No. 17/241,069, filed Apr. 27, 2021, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

FIELD OF THE DISCLOSURE

One technical field of the present disclosure is digital data processing. Another technical field is generation and search of electronic documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In today's dynamic world, jobs can be uniquely defined, and people can change jobs anytime. In describing a job and finding good candidates for the job, it is helpful to no longer focus on specific skills or amount of experience in a position but to instead recognize a full set of skills that is required by the job. There exist hundreds of thousands of skill names, though. Some of these skill names may have identical or similar meanings; some of these skill names may correspond to significantly related skills. It would therefore be useful to have a system that enables effective searches for skill names and related skill information and automatic generation of skill-related data, such as job descriptions or resumes, that match well to relevant jobs.

DETAILED DESCRIPTION

Figure 1:
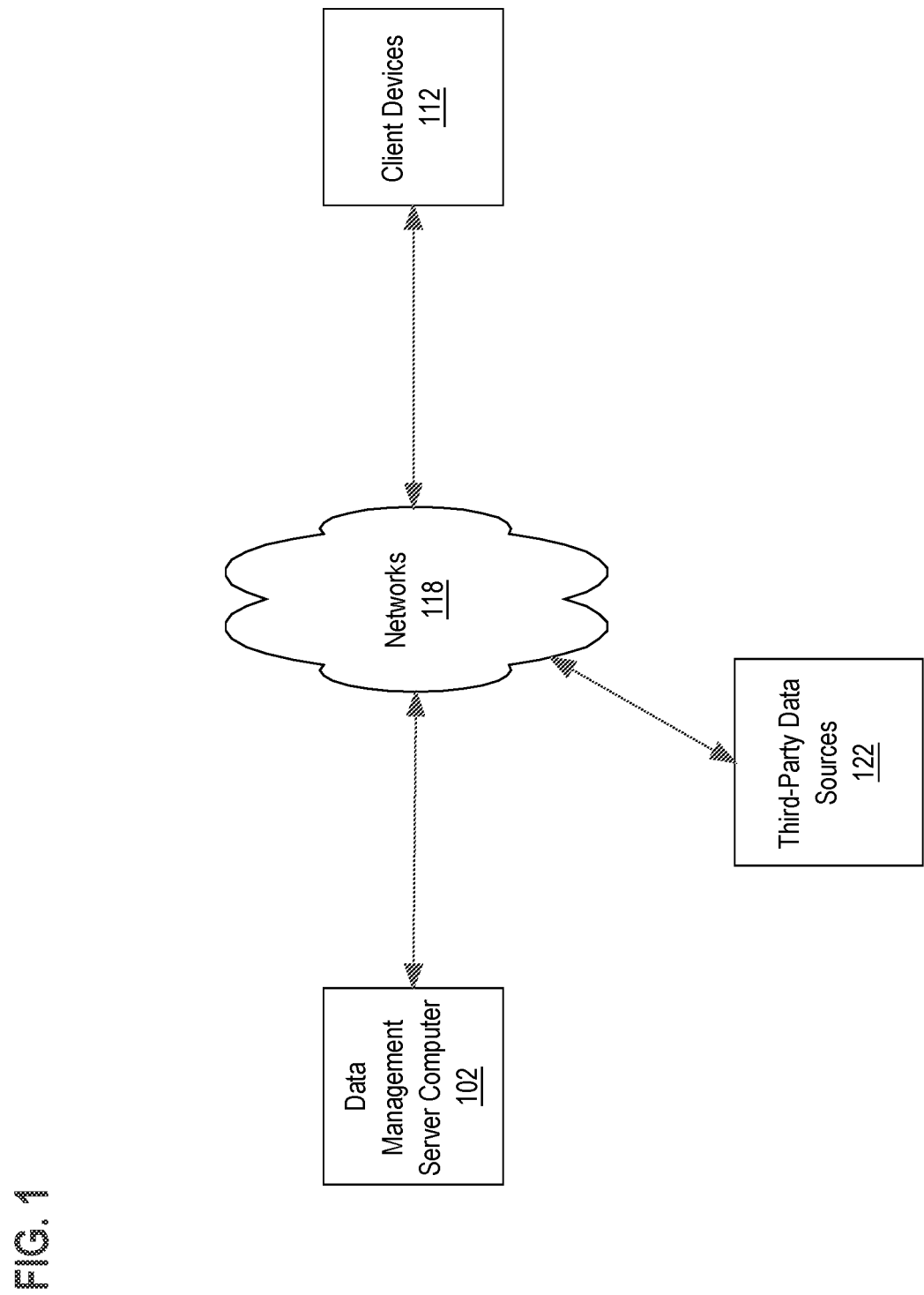
FIG. 1 illustrates an example networked computer system in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline:
1. GENERAL OVERVIEW
2. EXAMPLE COMPUTING ENVIRONMENT
3. EXAMPLE COMPUTER COMPONENTS
4. FUNCTIONAL DESCRIPTION
   4.1. Creating Dependency Graphs for Skill Names
   4.2. Generating Hypernym Trees for Skill Names
   4.3. Managing Knowledge Graphs for Skill Names
5. EXAMPLE PROCESSES
6. HARDWARE IMPLEMENTATION

1. GENERAL OVERVIEW

A data management server computer ("server") and related methods are disclosed to enhance electronic documents or search processes related to skill data, including skill names, using machine learning techniques. The server is programmed to organize skill names from a dictionary into a knowledge graph. The knowledge graph includes nodes that represent the skill names and words of the skill names and edges that represent syntactic or semantic relationships. The server is programmed to respond to skill-related requests using the knowledge graph and track access patterns of the knowledge graph in responding to the requests. The replies to the request can be generated based on the structure or access patterns of the knowledge graph and used as search results or skill-related data, such as resumes or job descriptions.

In some embodiments, the server accesses a dictionary of skill names, which could have hundreds of thousands of entries. A skill name is the name of an ability to do something, which could be related to a tool or a subject matter, for example. Examples of skill names include "product engineering" or "object-oriented programming". The server can also extract skill names and other skill information from data sources related to the search, training, evaluation, or utilization of skills, such as job search websites or human resources systems, using machine learning techniques.

In some embodiments, the server organizes the words in each skill name by retrieving a dependency graph for the skill name or creating one using machine learning techniques, where a node represents a word in the skill name and an edge represents a syntactic relationship. The dependency graph normally includes a syntactic root representing the word, typically a noun, to which all the other words in the skill name relate directly or indirectly. For example, for the skill name "systemized nomenclature of medicine", the syntactic root can be deemed to be "nomenclature". The other words can be a modifier or a preposition of the syntactic root, for example.

In some embodiments, the server also organizes the words in skill names by retrieving hypernym trees or creating them using machine learning techniques. A hypernym tree includes a node for a meaning of a word that is associated with a synset of synonyms, and an edge that represents a semantic relationship. In a hypernym tree, the nodes for two meanings respectively of two words may be connected because the two meanings are semantically related. For example, the node for a certain meaning of "abstract", which is summarily described as "give an abstract (of)", can be connected with the node for a certain meaning of "communication", which is summarily described as "something that is communicated by or to or between people or groups".

In some embodiments, the server is to assign semantics to a skill name so that they could be organized semantically by connecting the corresponding dependency graph with the hypernym trees. In certain embodiments, the dependency graph for the skill name and specifically the syntactic root can be matched to a node associated with a synset in a hypernym tree. Such matching can be performed in various ways, based on embeddings of the skill name and the words or phrases in the synset.

In some embodiments, upon assigning a meaning of a word based on a hypernym tree to a skill name, the server can connect dependency graphs based on the connections between the nodes in the hypernym trees. Specifically, when two dependency graphs respectively for two skill names are matched to two nodes in a hypernym tree that are connected by an edge, the two dependency graphs can be connected by an edge. The server therefore produces a knowledge graph that is the set of interconnected dependency graphs. The structure of the knowledge graph reflects the semantic relationships among the skill names.

In some embodiments, the server can receive skill-related requests and respond to the skill-related requests based on the knowledge graph. The server can track access patterns of the knowledge graph in responding to the requests and rely on the existing structure and access patterns of the knowledge graph to generate replies to the requests. A request can be a partial or full query including a partial or full skill name, and the response to the request can comprise extended queries or a search result for the query. A request can also be a job title or job category, and the response to the request comprise updated job descriptions or resumes for the job title or job category, for example.

The data management server computer offers many technical benefits. The server enables faster and more effective searches for skill-related information by automatically predicting intended queries and producing rich search results based on relevant and extensive skill-related data. The server also allows generation of higher-quality skill data, such as job postings, resumes, or career plans, similarly based on well-organized skill-related data of comprehensive coverage.

2. EXAMPLE COMPUTING ENVIRONMENT

FIG. 1 illustrates an example networked computer system in which various embodiments may be practiced. FIG. 1 is shown in simplified, schematic format for purposes of illustrating a clear example and other embodiments may include more, fewer, or different elements.

In some embodiments, the networked computer system comprises a data management server computer 102 ("server"), one or more third-party data sources 122, and one or more client devices 112, which are communicatively coupled directly or indirectly via one or more networks 118.

In some embodiments, the server 102 broadly represents one or more computers, virtual computing instances, and/or instances of a server-based application that is programmed or configured with data structures and/or database records that are arranged to host or execute functions including but not limited to collecting skill data, generating knowledge graphs, and improving the generation or search of digital documents related to skills. The server 102 can comprise a server farm, a cloud computing platform, a parallel computer, or any other computing facility with sufficient computing power in data processing, data storage, and network communication for the above-described functions.

In some embodiments, each of the one or more third-party data sources 122 is programmed to manage different types of data, such as data related to jobs or skills or data related to language syntax or semantics. The management may comprise collecting, generating, or storing relevant programming code or results of executing the programming code. The management may also comprise offering an interface for accessing the relevant programming code or the results of executing the programming code. Each of the third-party data sources 122 can similarly comprise a server farm, a cloud computing platform, or a parallel computer, may comprise a desktop computer, laptop computer, tablet computer, smartphone, or wearable device, or may comprise any other type of computing device with sufficient computing power in data processing, data storage, and network communication for the above-described functions.

In some embodiments, each of the one or more client devices 112 is programmed to submit requests, which can be related to skills, and process the replies to the requests. Each of the one or more client devices 112 can be programmed to also receive or transmit relevant data, such as resumes or job postings. Each of the one or more client devices 112 may comprise a desktop computer, laptop computer, tablet computer, smartphone, wearable device, or any other type of computing device with sufficient computing power in data processing, data storage, and network communication for the above-described functions.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, the server 102 is programmed to retrieve skill-related data, such as job postings and resumes, from the one or more third-party data sources 122. The server 102 can also be programmed to receive such data directly from users or the one or more client devices 112. The server 102 is programmed to then process the skill-related data, such as extracting skill names and metadata related to the skill names. The server 102 is programmed to retrieve additional skill-related data from the one or more third-party data sources 122, such as syntactic or semantic data for skill names, or tools that can be used to generate such data. The server 102 is configured to process all available data and construct a knowledge graph where skill names are organized comprehensively and intelligently. The server 102 can be programmed to receive a request from a client device of the one or more client devices 112 to use one or more functions, such as responding to a search query for data related to jobs or skills or generating or expanding a job posting or a resume. The request can include one or more words of a job title or a skill name. Depending on the selected function, the server 102 can be programmed to return additional words from a skill name, additional skill names, or other data related to skill names.

3. EXAMPLE COMPUTER COMPONENTS

Figure 2:
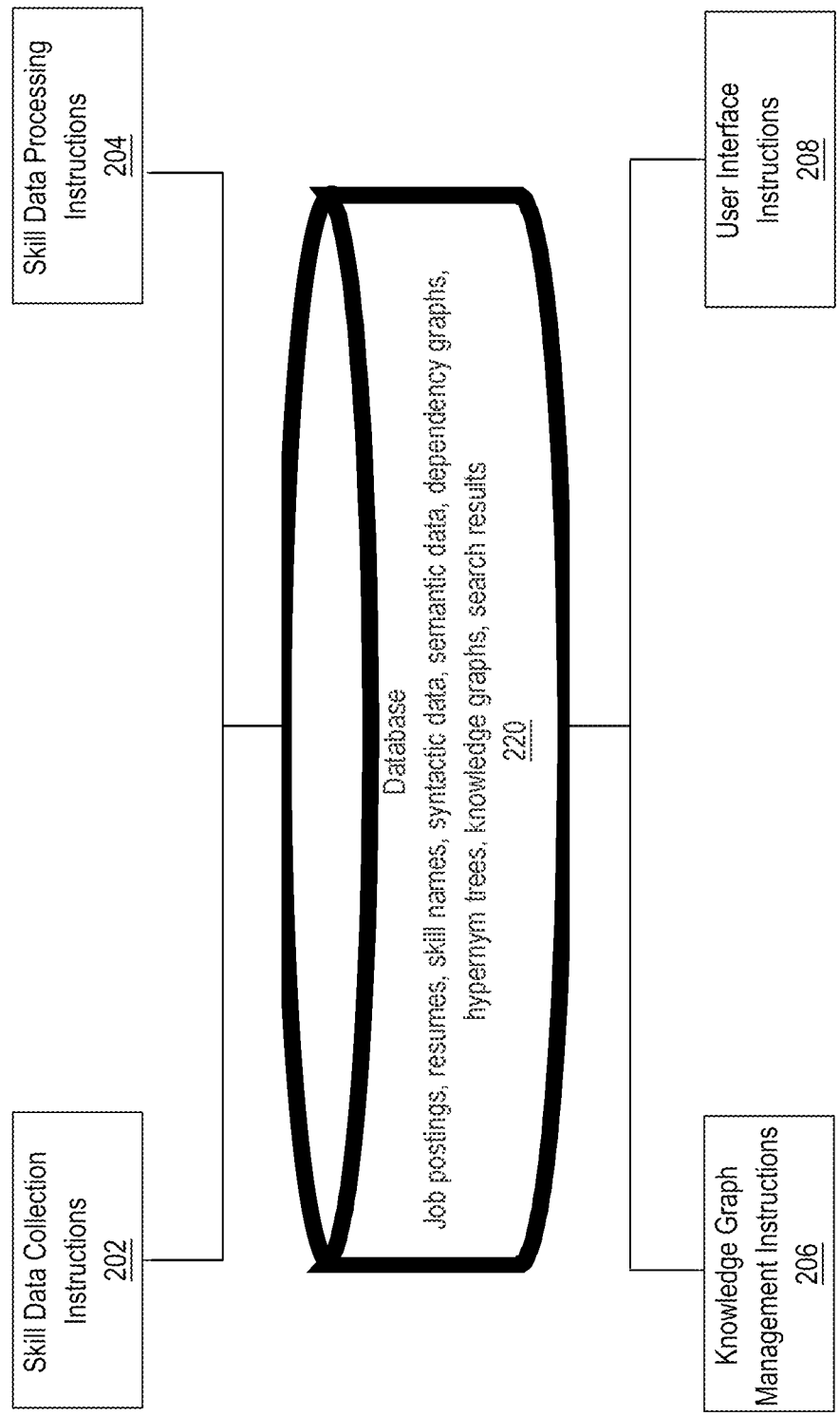
FIG. 2 illustrates example components of a data management server computer in accordance with the disclosed embodiments.

FIG. 2 illustrates example components of the data management server computer in accordance with the disclosed embodiments. This figure is for illustration purposes only and the server 102 can comprise fewer or more functional or storage components. Each of the functional components can be implemented as software components, general or specific-purpose hardware components, firmware components, or any combination thereof. A storage component can be implemented using any of relational databases, object databases, flat file systems, or JSON stores. A storage component can be connected to the functional components locally or through the networks using programmatic calls, remote procedure call (RPC) facilities or a messaging bus. A component may or may not be self-contained. Depending upon implementation-specific or other considerations, the components may be centralized or distributed functionally or physically.

In some embodiments, the server 102 can comprise skill data collection instructions 202, skill data processing instructions 204, knowledge graph management instructions 206, and user interface instructions 208. In addition, the server 102 can comprise a database module 220.

In some embodiments, the skill data collection instructions 202 enable collecting skill data from users or data sources and storing the skill data in local databases for further processing. The skill data may include job postings, resumes, skill descriptions, skill training information, skill evaluation information, or skill marketability information.

In some embodiments, the skill data processing instructions 204 enable processing of skill data. The processing might comprise extracting skill names or descriptions, generating metadata to be associated with the skill names, or identifying syntactic or semantic features of the skill names.

In some embodiments, the knowledge graph management instructions 206 enable building and updating a knowledge graph that organizes skill names. The building may comprise constructing dependency graphs for skill names that organize words within skill names, determining relationships among the skill names based on the syntactic or semantic features or other related data, or merging the dependency graphs based on the determined relationships. The knowledge graph can be updated when new skill data is received or when user interaction with the knowledge graph occurs, for example.

In some embodiments, the user interface instructions 208 enable interacting with users or user devices. The interacting may comprise receiving requests from users or user devices related to skills, transmitting replies to the requests, which can be generated from the knowledge graph, to user devices, or causing a display of the replies to the user or user devices. The interacting may also comprise receiving skill data from users, such as job descriptions or resumes to be added to a training database for use by the server 102 or to be enhanced for use by the user or the user device.

In some embodiments, the database 220 is programmed or configured to manage relevant data structures and store relevant data for functions performed by the server 102. The data may correspond to job postings, resumes, skill names, skill marketability or utilization information, career plans, job surveys, evaluation or training data related to jobs or skills, syntactic data, semantic data, vectors or embeddings representing words or phrases, similarity or distance data, dependency graphs, hypernym trees, knowledge graphs, client request or queries, or search results. The data may also correspond to programming code for generating embeddings or for determining syntactic or semantic relationships, or similarities or distances.

4. FUNCTIONAL DESCRIPTION

4.1. Creating Dependency Graphs for Skill Names

In some embodiments, the server is programmed or configured with data structures and/or database records that are arranged to perform various tasks as described herein. The server receives skill data, such as job descriptions, resumes for jobs, or data related to skill evaluation, utilization, marketability, or training, across geographies and job categories. The server can be provided with a database of skill names or build the database from the skill data. The building can be performed with supervised learning starting with a seed set of skill names, or unsupervised learning by identifying phrases that repeatedly or systematically appear in documents of the skill data, for example. The system can similarly generate additional information related to skills and stores the additional information in association with the skill names. For instance, the additional information for a skill name may include an applicable job category, a list of applicable job titles, a number of years of experience required or typically possessed for a job title, an amount of salary that can be commanded by the skill, a list of training courses or certificates required to demonstrate proficiency in the skill, or a usefulness indicator based on how often the skill is evaluated, how well the skill is utilized according to the evaluations, how marketable the skill is, or how much training material is available for the skill across the available skill data.

Figure 3:
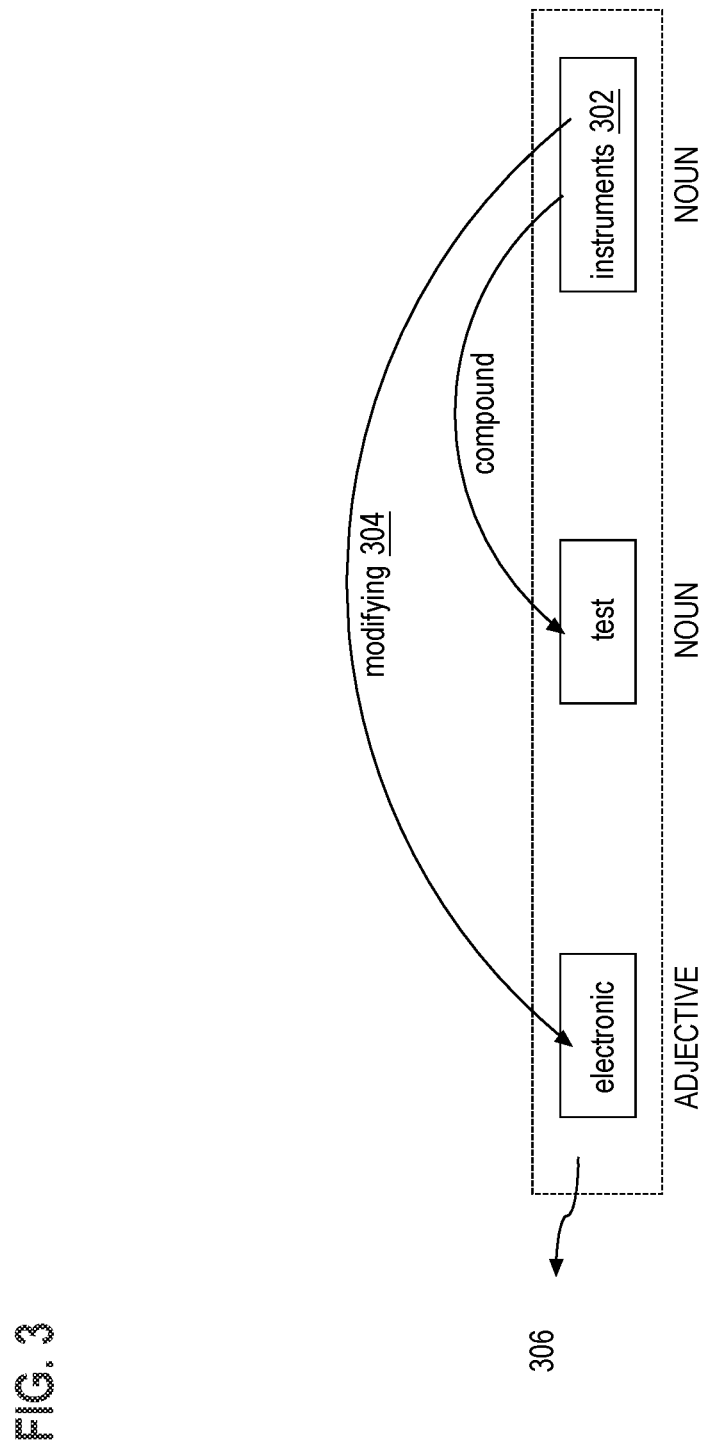
FIG. 3 illustrates a dependency graph for a skill name.

In some embodiments, for each skill name, the server constructs a dependency graph. FIG. 3 illustrates a dependency graph for a skill name. The server can perform a syntactic parse on the skill name using a method known to someone of ordinary skill in the art, such as open-source libraries by DeepPalov (version 0.14.0) or spaCy (version 3.0). The syntactic parse can generally be performed using national language processing techniques, including deep learning-powered models for tagger, parser or entity recognizer. In a skill name, such as "electronic test instruments" 306 indicating the ability to operate electronic test instruments, the syntactic parse can identify a word, such as "instruments", as the syntactic root, which is often a noun and serves as an initial node 302 in the dependency graph. The syntactic parse can further identify a second word in the skill name, such as "electronic", which can be an adjective or another noun to modify or have another relationship with another word. The relationship then corresponds to an edge 304 in the dependency graph. Therefore, the syntactic parse identifies the syntactic root as well as the chain of constituents that depend on that syntactic root.

Figure 4:
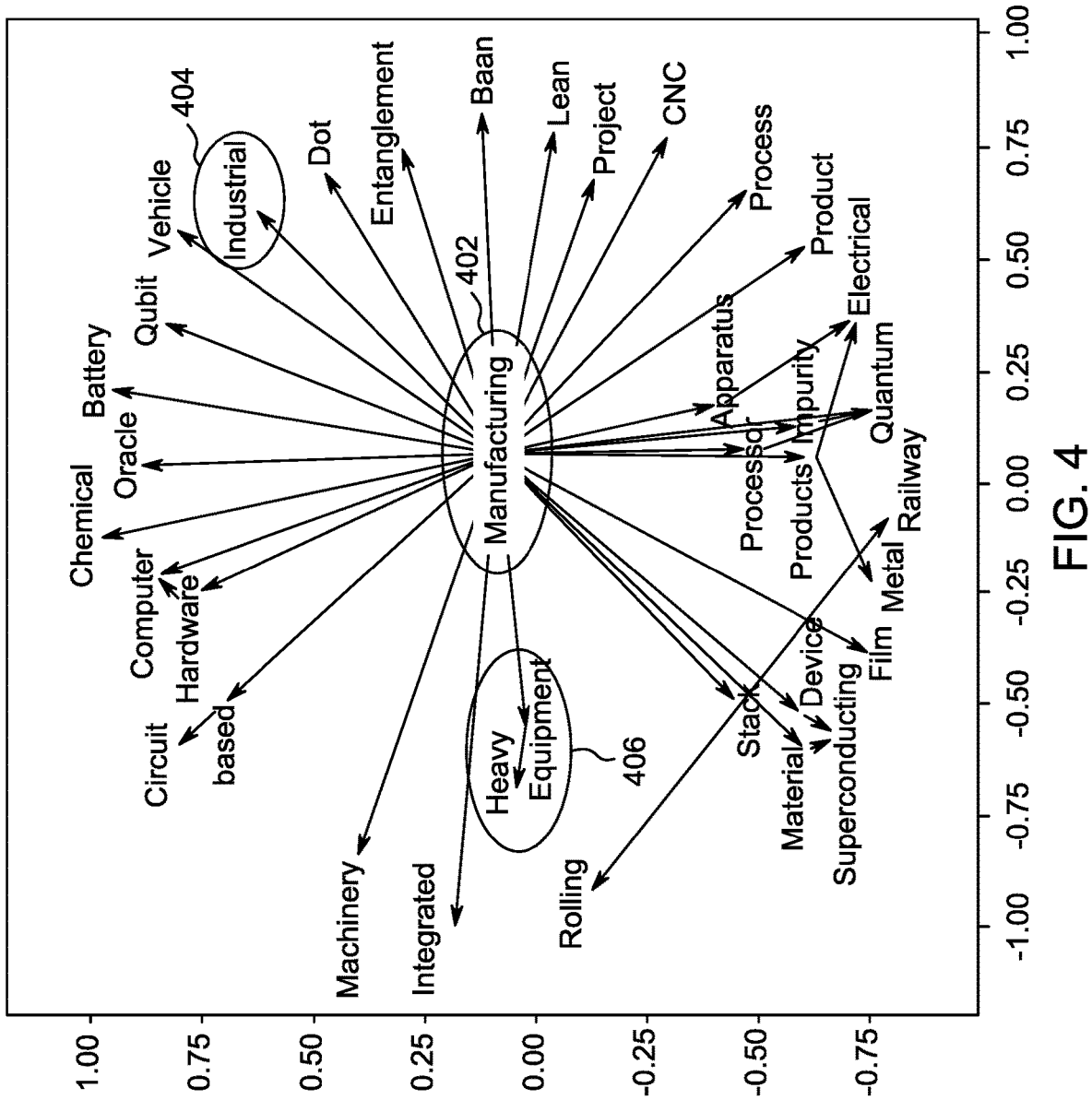
FIG. 4 illustrates a combination of dependency graphs.

In some embodiments, the server combines dependency graphs for the skill names in the database based on shared words. FIG. 4 illustrates a combination of dependency graphs. There are a number of skill names that contain the word "manufacturing". The dependency graphs for these skill names can be connected together by using a common node 402 for the word "manufacturing". For example, the skill name "industrial manufacturing" corresponds to a dependency graph that includes the node 404 for the word "industrial", and the skill name "heavy equipment manufacturing" corresponds to a dependency graph that includes the nodes 406 for the words "heavy" and "equipment".

4.2 Generating Hypernym Trees for Skill Names

In some embodiments, the sever merges dependency graphs through hypernym trees. The server first generates hypernym trees for the words of all the skill names in the database. As known to someone skilled in the art, a Y is a hypernym of X if every X is a (kind of) Y (e.g., "dog" is a hypernym of "canine"). Therefore, a hypernym tree could be established with a node corresponding to Y as the root with an edge from the root to a node corresponding to X. A traversal from the root of a hypernym tree down means an encounter of words having more and more specific meanings. A hypernym tree for a set of words could be obtained using a method known to someone skilled in the art, such as WordNet (version 3.1). In addition, a word can be polysemous—having multiple meanings. Each meaning could be associated with a summary description or a synset (a group of synonyms) and leads to a new path in the hypernym tree.

Figure 5A:
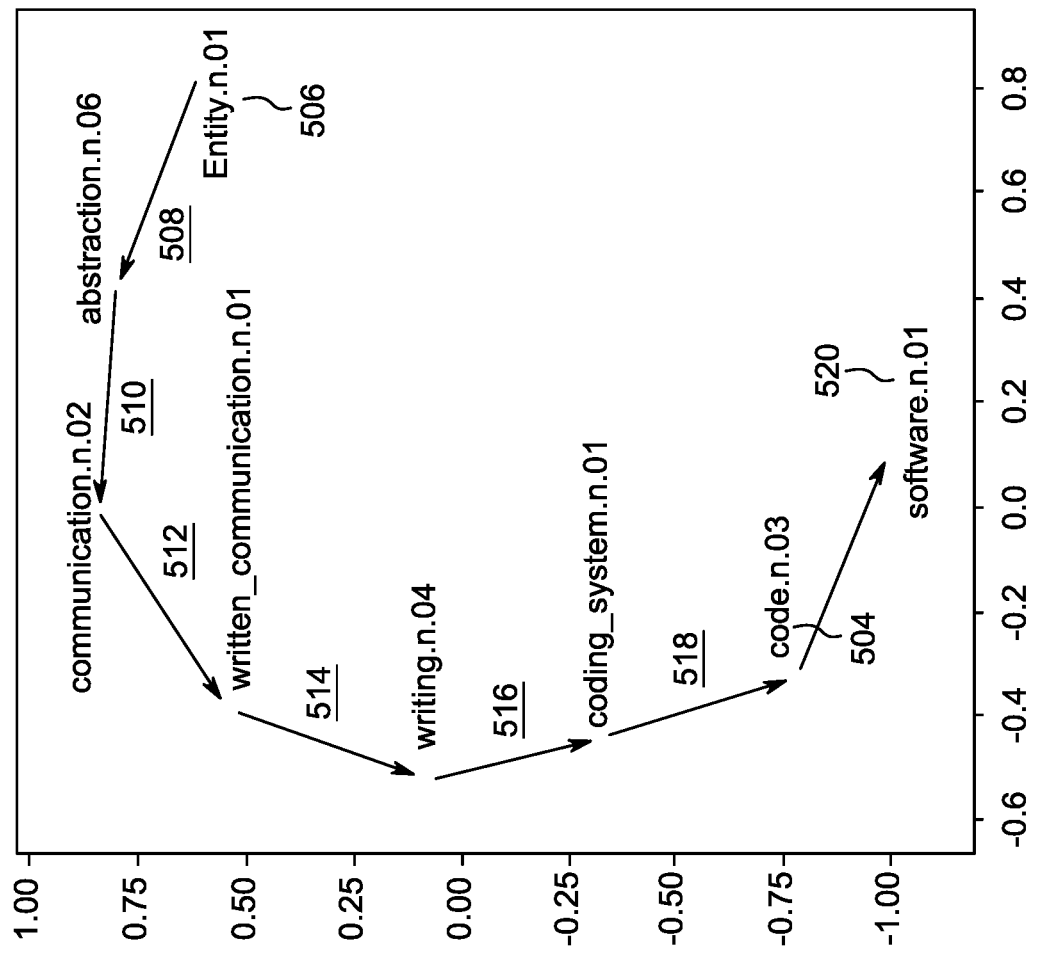
FIG. 5A illustrates an example hypernym tree involving "software".
Figure 5B:
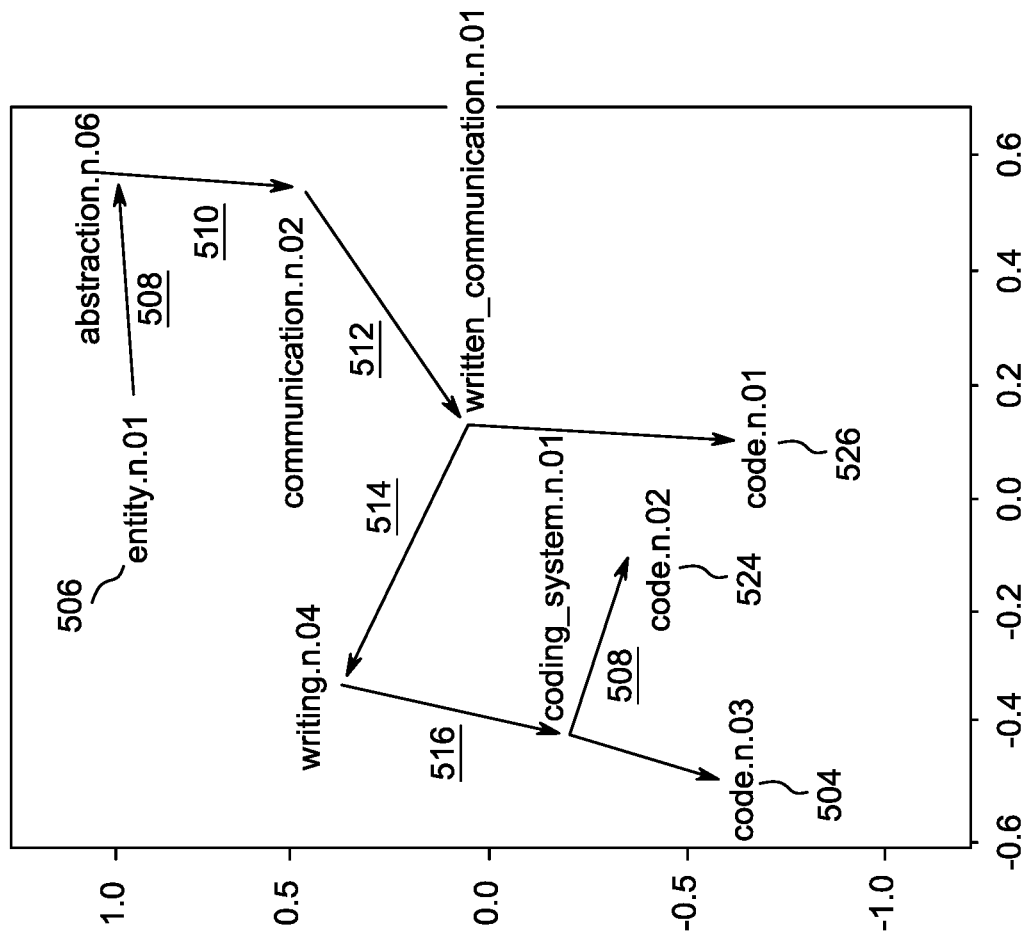
FIG. 5B illustrates an example hypernym tree involving "code".

FIG. 5 illustrates example hypernym trees. FIG. 5A illustrates an example hypernym tree involving the word "software". This hypernym tree starts with the node 506 representing "entity" n.01, where n.0X represents the Xth meaning of the word. The "software" hypernym tree then extends to the node 504 representing "code" n.03 through edges 508, 510, 512, 514, 516, and 518, and further extends to the node 520 representing "software" n.01. FIG. 5B illustrates an example hypernym tree involving "code". This hypernym tree starts with the same node 506 representing "entity" n.01, extends to the node 504 representing "code" n.03 through the same path, but it includes additional nodes 524 representing "node" n.02 and 526 representing "node" n.01.

In some embodiments, the server selects, for the word being the syntactic root of a skill name in the database, a particular meaning of the word using the hypernym trees involving the word. The server can create an embedding for each skill name in the database and each word or phrases in a synset of the hypernym trees involving a word in the skill names in the database with respect to a corpus. An example of the corpus comprises the set of job descriptions or resumes from which the database of skill names is derived that also include the words in the synsets. In one implementation, two embeddings are closers with respect to a distance measure in a vector space typically when the two words or phrases represented by the two embeddings are closer in semantic meanings, where the semantic meanings could characterize words or phrases that appear together in a corpus. The skill names can co-occur with certain job titles, skill name descriptions, related competencies, and so on in the corpus. The hypernym trees which include inherent groupings of words that are related. Therefore, the skill names by themselves or extended with co-occurring phrases can be matched with specific word meanings or the corresponding synset of words. The embeddings can then be generated using a method known to someone skilled in the art, such as GloVe or Word2Vec, which typically utilize neural networks. In an example, "production" is part of the skill names "music production", "video game production", and so on. The hypernym trees involving "production" may include nodes representing multiple meanings of "production", including the meaning summarily described by "a presentation for the stage or screen or radio or television", which has a synset comprising "staging" and "presentation". Therefore, embeddings could be created for each of the skill names, such as "music production" and "video game production", and the summary description of a word meaning, such as "a presentation for the stage or screen or radio or television", or each of the words or phrases in the synsets, such as "staging" or "presentation".

In some embodiments, the server assigns a meaning of a word to a skill name by comparing the generated embeddings. The server can measure a distance between the embedding for a skill name and one or more embeddings for each synset for a meaning of a word in the skill name, such as the synset for the word in the skill name designated as the syntactic root. The server can measure the distance between the embedding for the skill name and the embedding for each word or phrases in a synset and compute an aggregate distance of the distances as the distance between the skill name and the synset or the associated meaning of a word. The server can also compute an aggregate embedding of the embeddings for the words or phrases in a synset and measure the distance between the embedding for the skill name and the aggregate embedding as the distance between the skill name and the synset or the associated meaning of a word. Alternatively, the server can compute the distance between the embedding for the skill name and the embedding for the summary description of a synset or the associated meaning of a word. The distance can be computed using any similarity or distance measure known to someone skilled in the art, such as the cosine similarity or the Euclidean distance. The server then assigns a meaning of a word that leads to the smallest distance to the skill name based on the generated embeddings. In certain embodiments, the server can assign a meaning of a word that leads to the smallest distance only when the distance is below a threshold. When the smallest distance is not below the threshold, a catch-all meaning of the word can be assigned to the skill name.

In some embodiments, instead of combining dependency graphs for skill names based on shared words, as discussed above, the server merge or connect dependency graphs for skill names when they are assigned the same meaning of the word. For example, if a certain meaning of the word "production" with a summary description of "media-related production" is assigned to skill names "radio production" and "television production", the dependency graphs for the two skill names can be connected. The server can create a new node representing the certain meaning of the word and create an edge from the new node to all the dependency graphs for skill names assigned the certain meaning of the word.

In some embodiments, the server further combines dependency graphs by tracing the hypernym trees. The server can connect two sets of dependency graphs respectively associated with two meanings of two different words when the nodes representing the two meanings of the two different words are no more than a certain number of edges apart in a hypernym tree. Referring back to FIG. 5A, the node 504 representing "code" n.03 is directly connected with the node 520 representing "software" n.01, suggesting a close relationship between the two meanings of the two words. Therefore, the set of dependency graphs associated with "code" n.03 and thus connected to node representing "code" n.03 could be connected with the set of dependency graphs associated with "software" n.01 and thus connected to the node representing "software" n.01 by creating an edge between the node representing the "code" n.03 and the node representing "software" n.01. According to WordNet, for example, "software" n.01 is summarily described as "written programs or procedures or rules and associated documentation pertaining to the operation of a computer system and that are stored in read/write memory", while "code" n.03 among multiple meanings of the word "code" is summarily described as "the symbolic arrangement of data or instructions in a computer program or the set of such instructions". Therefore, while "software" and "code" appear very different syntactically, the server can automatically group together their associated skill names as appropriate. The resulting superset of dependency graphs can then be considered as a knowledge graph for skill names.

4.3 Managing Knowledge Graphs for Skill Names

Figure 6:
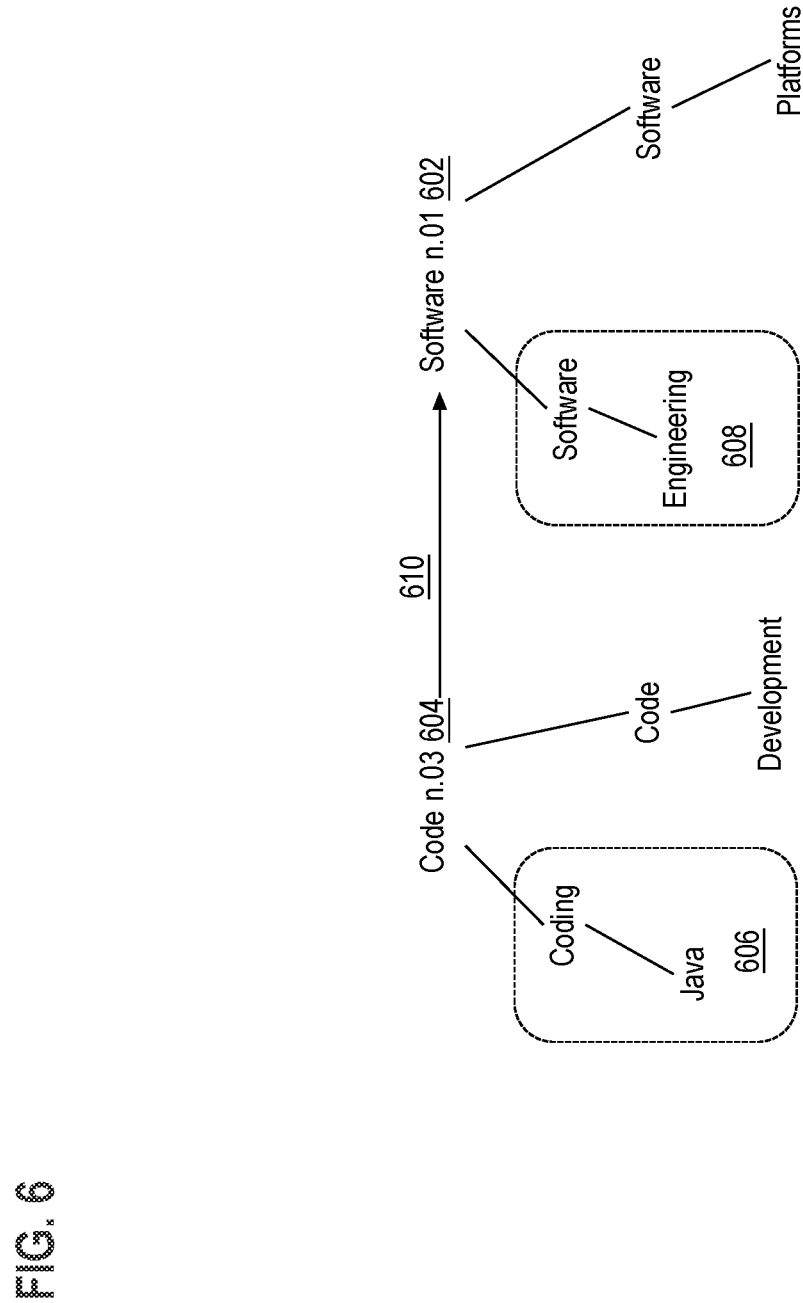
FIG. 6 illustrates an example knowledge graph.

FIG. 6 illustrates an example knowledge graph. The knowledge graph comprises a node 602 representing "software" n.01, a node 604 representing "code" n.03, and all the attached dependency graphs. The dependency graph 606 for the skill name "Java coding" has a syntactic root "code". The meaning of "code" corresponding to "code" n.03 is assigned to the skill name "Java coding". Therefore, the dependency graph 606 is connected to the node 604 representing "code" n.03 in the knowledge graph. Similarly, dependency graph 608 for the skill name "software development" has a syntactic root "software". The meaning of "software" corresponding to "software" n.01 is assigned to the skill name "software development". Therefore, the dependency graph 608 is connected to the node 602 representing "software" n.01 in the knowledge graph.

In some embodiments, the server receives a request from a user or a user device. The request can specify a skill name and optionally a degree, which indicates the scope of processing in response to the request. In response, the server can select all the skill names such that the distance (e.g., the length of the shortest path) in the knowledge graph between a node representing a word in the received skill name and a node representing a word in a selected skill name is below some threshold based on the received degree or a predetermined degree. For example, the received skill name could be "Java coding". The degree could be one, which can be considered to correspond to a distance of one. The distance between the dependency graph for "Java coding" and that for "code development" can be computed to be zero (both connected to the node 604 in FIG. 6) and the distance between the dependency graph for "Java coding" and that for "software engineering" can be computed to be one (through the edge 610 in FIG. 6), both "code development" and "software engineering" can be sent to the client device, as related skill names.

In some embodiments, the server tracks the access patterns of the knowledge graph. In response to a request, the nodes and edges of the knowledge graph are accessed, as further discussed below. The server can maintain another data structure for the skill names, such as a table that might include an initial dictionary or an index of skill names, for such tracking or other purposes. For each node in the knowledge graph or each set of nodes corresponding to a skill name, the server can record the list of matching requests, the number of times the (encompassing) skill name is included in a request or a response to a request, or the number of edges traversed before the node or the set of nodes is reached from a second node directly corresponding to a request (the distance between the node and the second node). In traversing the knowledge graph, the directionality of an edge, such as the edge 610 in FIG. 6, which can be derived from the hypernym trees discussed in above, can be considered or ignored. In one embodiment, the directionality is ignored in traversing an edge, but is taken into consideration in deciding how to weigh the dependency graphs attached to the nodes that are endpoints of the edge, as further discussed below. The skill names associated with the nodes or edges that are accessed more frequently or directly could be given higher priority in a ranking, for example.

In some embodiments, the server can be coupled to or integrated with a system that is a search engine or a data generator. As a search engine, a request can include a partial query including a partial skill name before an indication that the query is complete is received by the server, and the server can (or cause the coupled system to) determine how to extend the partial query by matching the partial query to skill names represented in the knowledge graph. The server can generate a list of skill names that match the partial query based on certain matching criteria, such as fuzzy matching using regular expressions. The server can further rank the list of skill names based on the size (e.g., the number of nodes) of the subgraph of the knowledge graph for a skill name. The subgraph can include all nodes within a distance from a node or a set of nodes representing the skill name, where the distance can be a predetermined value or can be determined from the request (e.g., the degree discussed above). The server can also rank the list of skill names using other properties of the knowledge graph or other information stored in association with the skill names; the server can then return the ranked list of skill names in response to the request.

In some embodiments, when the request now includes a full query, the server can then return all the skill names in the subgraph, for example. The server can also return additional information associated with the skill names, in terms of utilization, marketability, training, or evaluation, for example. These skill names can be ranked based on the distance between the corresponding nodes to the node or the set of nodes representing the skill name in the full query. The skill names can also be ranked based on how frequently the corresponding nodes in the knowledge graph are accessed or how they are accessed (directly, via one or more directed edges, etc.) in response to the request. For example, when a node for a skill name is reached via one or more directed edges that go form a narrower meaning to a broader meaning, the skill name could be given a higher rank when the purpose of the query goal is to find a generalized skill name or a lower rank when the goal is to identify specializations of the corresponding skill.

As a data generator, a request can include a skill name, and the server can (or cause the coupled system to) similarly identify a subgraph for the skill name from the knowledge graph. The request can also include a job category or a job title, and the server can identify a subgraph including all nodes corresponding to skill names associated with the job category or job title. For both types of requests, the server can then automatically generate the list of skill names from the subgraphs and other related information as a section of an enhanced job description, resume, career plan, job survey, or other data related to jobs or skills as output data for further use. The list of skill names can similarly be ranked, as discussed above, for listing in the output data in the ranked order. For a job description, the related information for a skill name may include the number of years of experience preferred, the types of certificates required, or an importance indicator of the skill for the job. For a resume, the related information for a skill name may similarly include the number of years of experience preferred, the types of certificates required, the types of training courses taken, etc., but allows the user to adjust the information to match the personal qualification.

5. EXAMPLE PROCESSES

Figure 7:
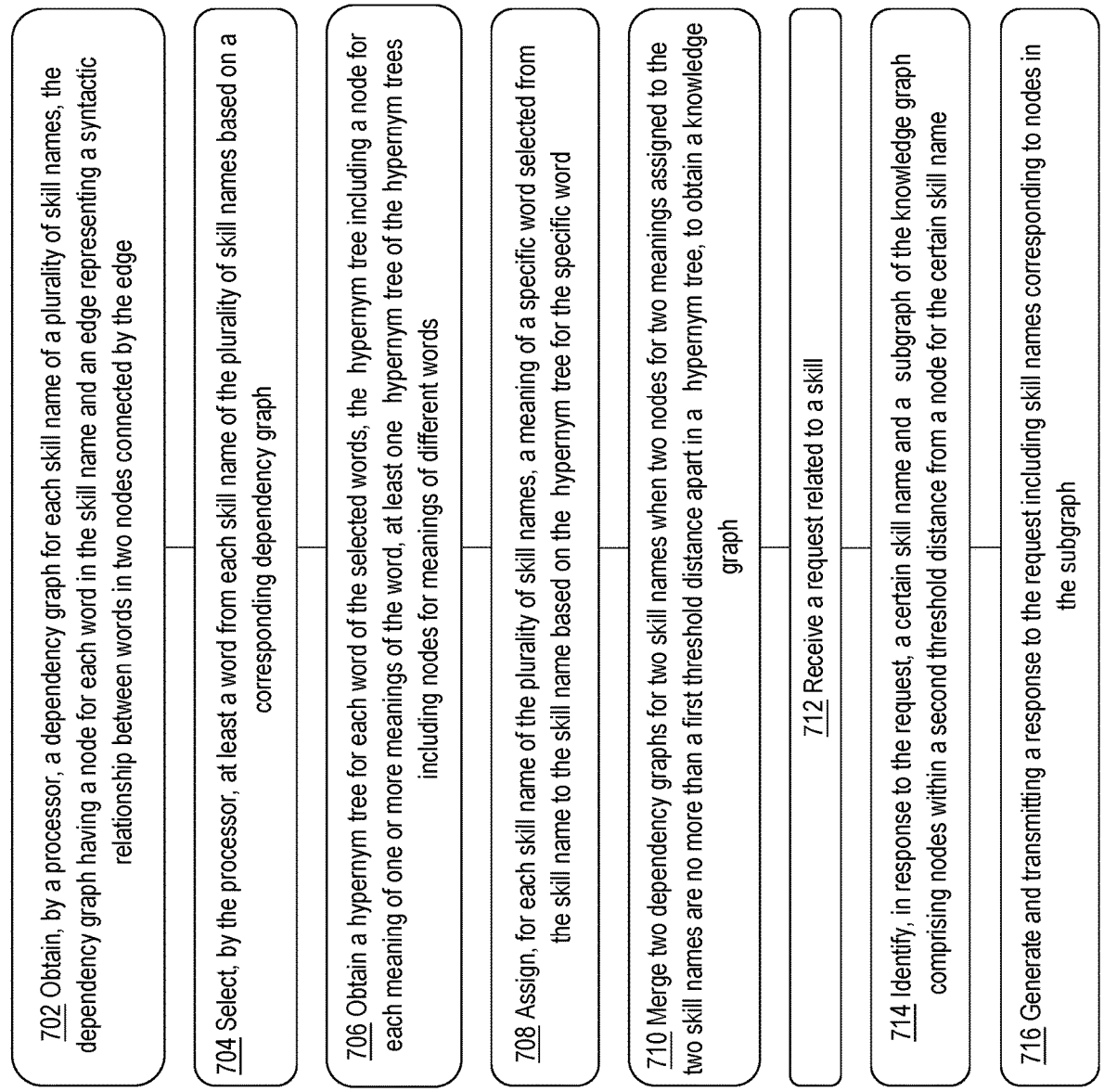
FIG. 7 illustrates an example process performed by a data management server of generating skill data for job search, job hiring, or skill research.

FIG. 7 illustrates an example process performed by a data management server of identifying a comprehensive list of related skill names for a given purpose. FIG. 7 is shown in simplified, schematic format for purposes of illustrating a clear example and other embodiments may include more, fewer, or different elements connected in various manners. FIG. 7 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In one embodiment, the server is programmed to receive skill data related to skill utilization, evaluation, training, or marketability; and determine from the skill data, for each skill name of the plurality of skill names, an applicable job category, a list of applicable job titles, an average number of years of experience required or possessed, an amount of salary that can be commanded by the skill, a list of training courses or certifications required or completed, or a usefulness indicator based on how often a corresponding skill is evaluated, how well the skill is utilized, how marketable the skill is, or how much training material is available for the skill, using natural language processing techniques.

In some embodiments, in step 702, the server is programmed or configured to obtain a dependency graph for each skill name of a plurality of skill names, the dependency graph having a node for each word in the skill name and an edge representing a syntactic relationship between words in two nodes connected by the edge.

In some embodiments, in step 704, the server is programmed or configured to select at least a word from each skill name of the plurality of skill names based on a corresponding dependency graph.

In some embodiments, in step 706, the server is programmed or configured to obtain a hypernym tree for each word of the selected words. The hypernym tree includes a node for each meaning of one or more meanings of the word, and at least one hypernym tree of the hypernym trees including nodes for meanings of different words.

In obtaining the hypernym tree, in one embodiment, the server is programmed to apply a tagger, parser, or text categorizer in a form statistical models, including a neural network. In another embodiment, the server is programmed to merge two dependency graphs for two skill names when the two skill names share a word. In yet another embodiment, the server is configured to identify a syntactic root from a skill name and retrieve or create a hypernym tree corresponding to the syntactic root.

In some embodiments, in step 708, the server is programmed or configured to assign, for each skill name of the plurality of skill names, a meaning of a specific word selected from the skill name to the skill name based on the hypernym tree for the specific word.

In one embodiment, each node of an obtained hypernym tree for a meaning of a word including one or more words or phrases corresponding to the meaning. In assignment a meaning of a specific word to a skill name, the server is programmed to create an embedding for each skill name of the plurality of skill names and for each word or phrase in a node of each obtained hypernym tree based on a set of documents having occurrences of the plurality of skill names and the words and phrases included in nodes of the obtained hypernym trees, where two embeddings are closer in a vector space for two corresponding skill names, words, or phrases that are closer in a semantics space defined by the set of documents.

In another embodiment, in assigning a meaning of a specific word to a skill name, the server is programmed to compute, for a skill name and a node of an obtained hypernym tree, a similarity score for the embedding for the skill name and the embedding for each word or phrase included in the node; calculate an aggregate similarity score of the similarity scores over the node; and associate the skill name with a meaning of a word associated with a node of any obtained hypernym tree that leads to a highest aggregate similarity score.

In yet another embodiment, in assigning a meaning of a specific word to a skill name, the server is programmed to compute, for each node of an obtained hypernym tree, an aggregate embedding of embeddings for any words or phrases included in the node; compute, for a skill name and a node of an obtained hypernym tree, a similarity score for the embedding for the skill name and the aggregate embedding for the node of the obtained hypernym tree; and associate the skill name with a meaning of a word associated with a node of any obtained hypernym tree that leads to a highest similarity score.

In some embodiments, in step 710, the server is programmed or configured to merge two dependency graphs for two skill names when two nodes for two meanings assigned to the two skill names are no more than a first threshold distance apart in a hypernym tree, to obtain a knowledge graph.

In one embodiment, the server is programmed to track access patterns of the knowledge graph, including maintaining, for each node of the knowledge graph representing a word in a skill name or a set of nodes corresponding to the skill name, a list of matching requests, a number of times the skill name is included in a request or a response to a request, or a number of edges traversed before the node or the set of nodes is reached from a second node directly corresponding to a request.

In some embodiments, in step 712, the server is programmed or configured to receive a request related to a skill.

In some embodiments, in step 714, the server is programmed or configured to identify, in response to the request, a certain skill name and a subgraph of the knowledge graph comprising nodes within a second threshold distance from a node for the certain skill name.

In some embodiments, in step 716, the server is programmed or configured to generate and transmit a response to the request including skill names corresponding to nodes in the subgraph.

In one embodiment, the request is a partial query. The server is programmed to then perform the identifying step in real time. The server is programmed to further select a list of skill names represented in the knowledge graph that match the partial query based on a matching criterion; and rank the list of skill names based on, for each skill name, a corresponding matching score from matching with the partial query, a size of a corresponding subgraph, or an access pattern associated with a corresponding node or set of nodes in the knowledge graph. The server is programmed to also perform the generating and transmitting step in real time, including providing the ranked list of skill names as candidates for extending the partial query.

In another embodiment, the request is a full query. The server is programmed to then perform the identifying step in real time. The server is programmed to further select a list of skill names in the knowledge graph that match the full query based on a matching criterion; determine, for each skill name of the list of skill names, a subgraph of the knowledge graph that comprises a node for the skill name and all nodes within a certain distance from the node; and rank a set of all skill names represented in the list of subgraphs based on, for each skill name, a corresponding matching score from matching with the full query, a corresponding usefulness indicator, a distance in the knowledge graph between a corresponding node to a node for a skill name of the list of skill names, or an access pattern associated with the corresponding node in the knowledge graph. The server is programmed to also perform the generating and transmitting step in real time, including providing the ranked set of skill names as a search result to the full query.

In yet another embodiment, the request comprises a skill name, a job title, or a job description. In identifying a skill name and a subgraph of the knowledge graph, the server is programmed to select a list of skill names in the knowledge graph having metadata that match the request based on a matching criterion; determine, for each skill name of the list of skill names, a subgraph of the knowledge graph that comprises the node for the skill name and all nodes within a certain distance from the node; rank a set of all skill names in the list of subgraphs based on, for each skill name, a corresponding matching score from matching with the request, a distance in the knowledge graph between a corresponding node to a node for a skill name of the list of skill names, information related to evaluation, utilization, marketability, or training of a corresponding skill, or an access pattern associated with the corresponding node in the knowledge graph. In performing the generating and transmitting step, the server is also programmed to provide the ranked set of skill names and associated information related to evaluation, utilization, marketability, or training of corresponding skills as a response to the request.

6. HARDWARE IMPLEMENTATION

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
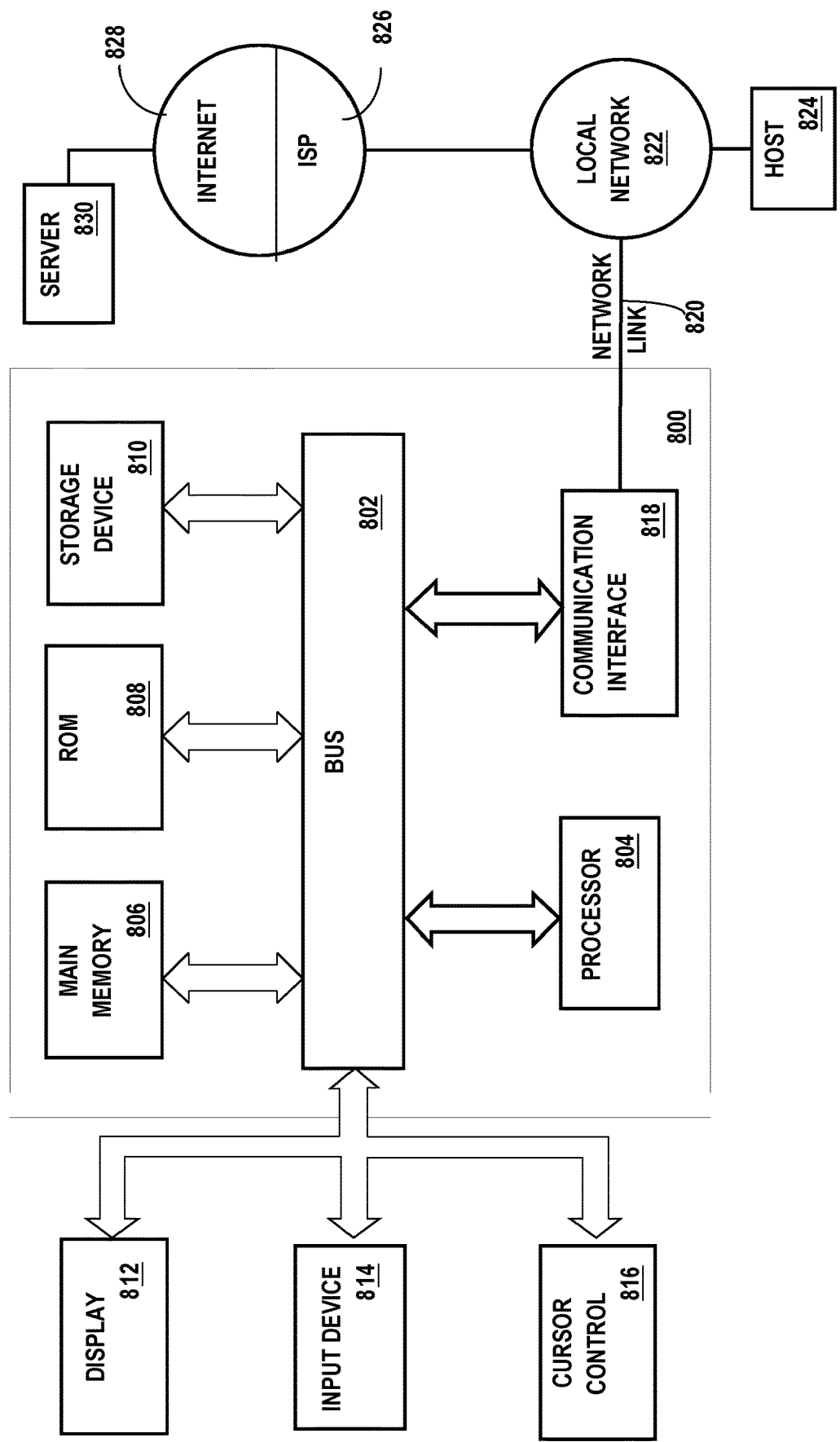
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of generating skill data for job search, job hiring, or skill research, comprising:
    obtaining, by a processor, a graph for each skill name of a plurality of skill names;
    obtaining, by the processor, a hypernym tree for a word selected from each skill name of the plurality of skill names,
        the hypernym tree including a node for each meaning of one or more meanings of the word,
        at least one hypernym tree of the hypernym trees including nodes for meanings of different words;
    assigning, for each skill name of the plurality of skill names, a meaning of the word selected from the skill name to the skill name based on the hypernym tree for the word;
    connecting two graphs for two skill names when two nodes for two meanings assigned to the two skill names are no more than a first threshold distance apart in a hypernym tree, to obtain a knowledge graph;
    receiving a request related to a skill;
    identifying, in response to the request, a certain graph for a certain skill name and a subgraph of the knowledge graph comprising nodes within a second threshold distance from the certain graph;
    generating and transmitting a response to the request including skill names corresponding to nodes in the subgraph.

2. The computer-implemented method of claim 1,
    the graph being a dependency graph having a node for each word in the skill name and an edge representing a syntactic relationship between words in two nodes connected by the edge,
    the word being selected from each skill name of the plurality of skill names based on a corresponding dependency graph.

3. The computer-implemented method of claim 2, the obtaining the hypernym tree comprising identifying a syntactic root from a skill name and retrieving or creating a hypernym tree corresponding to the syntactic root.

4. The computer-implemented method of claim 1, the obtaining the graph comprising applying a tagger, parser, or text categorizer in a form of statistical models, including a neural network.

5. The computer-implemented method of claim 1, the obtaining the graph comprising merging two graphs for two skill names when the two skill names share a word.

6. The computer-implemented method of claim 1,
    each node of an obtained hypernym tree for a meaning of a word including one or more synonyms corresponding to the meaning and a summary description of the meaning, the assigning further comprising:
    creating an embedding for each skill name of the plurality of skill names and for each synonym and the summary description in a node of each obtained hypernym tree based on a set of documents having occurrences of the plurality of skill names and the synonyms and the summary descriptions included in nodes of the obtained hypernym trees, two embeddings being closer in a vector space for the corresponding skill name and synonym or summary description that are closer in a semantics space defined by the set of documents.

7. The computer-implemented method of claim 6, the assigning further comprising:
    computing, for a skill name and a node of an obtained hypernym tree, a distance between the embedding for the skill name and the embedding for the summary description included in the node;
    associating the skill name with a meaning of a word associated with a node of any obtained hypernym tree that leads to a lowest distance when the lowest distance is above a threshold or assigning the skill name with a catch-all meaning when the lowest distance is not above the threshold.

8. The computer-implemented method of claim 6, the assigning further comprising:
   computing, for a skill name and a node of an obtained hypernym tree, a similarity score for the embedding for the skill name and the embedding for each synonym included in the node;
   calculating an aggregate similarity score of the similarity scores over the node;
   associating the skill name with a meaning of a word associated with a node of any obtained hypernym tree that leads to a highest aggregate similarity score.

9. The computer-implemented method of claim 6, the assigning further comprising:
   computing, for each node of an obtained hypernym tree, an aggregate embedding of embeddings for any synonyms included in the node;
   computing, for a skill name and a node of an obtained hypernym tree, a similarity score for the embedding for the skill name and the aggregate embedding for the node of the obtained hypernym tree;
   associating the skill name with a meaning of a word associated with a node of any obtained hypernym tree that leads to a highest similarity score.

10. The computer-implemented method of claim 9, further comprising merging two graphs for two skill names that have been assigned a common meaning in the knowledge graph.

11. The computer-implemented method of claim 1, further comprising:
    receiving skill data related to skill utilization, evaluation, training, or marketability;
    determining from the skill data, for each skill name of the plurality of skill names, an applicable job category, a list of applicable job titles, an average number of years of experience required or possessed, an amount of salary that can be commanded by the skill, a list of training courses or certifications required or completed, or a usefulness indicator based on how often a corresponding skill is evaluated, how well the skill is utilized, how marketable the skill is, or how much training material is available for the skill, using natural language processing techniques.

12. The computer-implemented method of claim 1, further comprising tracking access patterns of the knowledge graph, including maintaining, for each node of the knowledge graph representing a word in a skill name or a set of nodes corresponding to the skill name, a list of matching requests, a number of times the skill name is included in a request or a response to a request, or a number of edges traversed before the node or the set of nodes is reached from a second node directly corresponding to a request.

13. The computer-implemented method of claim 1, the request being a partial query,
    the identifying being performed in real time, comprising:
    selecting a list of skill names represented in the knowledge graph that match the partial query based on a matching criterion;
    ranking the list of skill names based on, for each skill name, a corresponding matching score from matching with the partial query, a size of a corresponding subgraph, or an access pattern associated with a corresponding node or set of nodes in the knowledge graph,
    the generating and transmitting being performed in real time, comprising providing the ranked list of skill names as candidates for extending the partial query.

14. The computer-implemented method of claim 1,
    the request being a full query,
    the identifying being performed in real time, comprising:
    selecting a list of skill names in the knowledge graph that match the full query based on a matching criterion;
    determining, for each skill name of the list of skill names, a subgraph of the knowledge graph that comprises a node for the skill name and all nodes within a certain distance from the node;
    ranking a set of all skill names represented in the list of subgraphs based on, for each skill name, a corresponding matching score from matching with the full query, a corresponding usefulness indicator, a distance in the knowledge graph between a corresponding node to a node for a skill name of the list of skill names, or an access pattern associated with the corresponding node in the knowledge graph,
    the generating and transmitting being performed in real time, comprising providing the ranked set of skill names as a search result to the full query.

15. The computer-implemented method of claim 1,
    the request comprising a skill name, a job title, or a job description,
    the identifying comprising:
    selecting a list of skill names in the knowledge graph having metadata that match the request based on a matching criterion;
    determining, for each skill name of the list of skill names, a subgraph of the knowledge graph that comprises the node for the skill name and all nodes within a certain distance from the node;
    ranking a set of all skill names in the list of subgraphs based on, for each skill name, a corresponding matching score from matching with the request, a distance in the knowledge graph between a corresponding node to a node for a skill name of the list of skill names, information related to evaluation, utilization, marketability, or training of a corresponding skill, or an access pattern associated with the corresponding node in the knowledge graph,
    the generating and transmitting comprising providing the ranked set of skill names and associated information related to evaluation, utilization, marketability, or training of corresponding skills as a response to the request.

16. The computer-implemented method of claim 15,
    the hypernym tree including a directed edge from a first node having a first meaning to a second node having a second meaning more specific than the first meaning,
    when the request includes a demand for a generalized skill name from the certain skill name, the ranking comprising assigning a higher rank to a first skill name to which a third meaning is assigned that is more specific than a fourth meaning assigned to the certain skill name based on the hypernym tree.

17. The computer-implemented method of claim 1, the request further comprising a degree that determines the second threshold distance.

18. One or more non-transitory storage media storing instructions which, when executed by one or more computing devices, cause performance of a method of generating skill data for job search, job hiring, or skill research, the method comprising:

obtaining a graph for each skill name of a plurality of skill names;

obtaining a hypernym tree for a word selected from each skill name of the plurality of skill names, the hypernym tree including a node for each meaning of one or more meanings of the word, at least one hypernym tree of the hypernym trees including nodes for meanings of different words;

assigning, for each skill name of the plurality of skill names, a meaning of the word selected from the skill name to the skill name based on the hypernym tree for the word;

connecting two graphs for two skill names when two nodes for two meanings assigned to the two skill names are no more than a first threshold distance apart in a hypernym tree, to obtain a knowledge graph;

receiving a request related to a skill;

identifying, in response to the request, a certain graph for a certain skill name and a subgraph of the knowledge graph comprising nodes within a second threshold distance from the certain graph;

generating and transmitting a response to the request including skill names corresponding to nodes in the subgraph.

19. The one or more non-transitory storage media of claim 18, the graph being a dependency graph having a node for each word in the skill name and an edge representing a syntactic relationship between words in two nodes connected by the edge, the word being selected from each skill name of the plurality of skill names based on a corresponding dependency graph.

20. The one or more non-transitory storage media of claim 19, the obtaining the hypernym tree comprising identifying a syntactic root from a skill name and retrieving or creating a hypernym tree corresponding to the syntactic root.

* * * * *